United States Patent
Sassa et al.

[11] Patent Number: 5,596,608
[45] Date of Patent: Jan. 21, 1997

[54] FADING DISTORTION COMPENSATION METHOD AND CIRCUIT

[75] Inventors: Atsushi Sassa; Masaru Adachi, both of Kodaira, Japan

[73] Assignee: Hitachi Denshi Kabushiki Kaisha, Tokyo, Japan

[21] Appl. No.: 240,381

[22] Filed: May 10, 1994

[30] Foreign Application Priority Data

May 11, 1993 [JP] Japan ..................... 5-132707

[51] Int. Cl.⁶ ................. H03D 1/04; H04B 1/10
[52] U.S. Cl. ............................. 375/346; 455/296
[58] Field of Search ................... 375/285, 346, 375/363, 364; 370/110.2, 110.3; 455/63, 296

[56] References Cited

U.S. PATENT DOCUMENTS

| | | |
|---|---|---|
| 3,895,298 | 7/1975 | Schollmeier . |
| 5,140,615 | 8/1992 | Jasper et al. ........................ 375/347 |
| 5,414,735 | 5/1995 | Marchetto et al. ................. 375/346 |

OTHER PUBLICATIONS

"Rayleigh Fading Compensation Method for Multi-Level QAM for Land Mobile Communications" Review of the Communications Research Lab., pp. 87–98 Feb. 1991.

"Performance Of Implemented 16QAM Modem for Land Mobile Communication System," Review of the Communications Research Lab., pp. 99–107 Feb. 1991.

"Multi–Level Quadrature Amplitude Modualtion Techniques," Review of the Communications Research Lab., pp. 85–86 Feb. 1991.

*Primary Examiner*—Tesfaldet Bocure
*Attorney, Agent, or Firm*—Antonelli, Terry, Stout & Kraus, LLP

[57] ABSTRACT

A communication system of a time division multiple access method in which transmission data are transmitted in a unit of a frame having a predetermined number of symbols in which a pilot symbol is periodically inserted in a series of data symbols for compensation of fading distortion and a carrier is reset at each frame. A phase correction circuit for correcting phase variation due to the reset of carrier phase at each frame is provided. When pilot symbols except a frame in which fading distortion is to be compensated are used in a receiving side, the pilot symbols corrected by the phase correction circuit can be selected to thereby compensate fading distortion exactly regardless of an insertion position of pilot symbols in the frame even by using the interpolation method.

5 Claims, 5 Drawing Sheets

○ : DISTORTION AMOUNT IN PILOT SYMBOL

● : DISTORTION AMOUNT IN DATA SYMBOL $K_1 = \cos\theta$
$K_2 = \sin\theta$

FADING DISTORTION COMPENSATION METHOD AND CIRCUIT

BACKGROUND OF THE INVENTION

The present invention relates to an improved method of compensating for fading distortion in a digital mobile communication system and a circuit thereof.

As a conventional fading compensation technique in a digital mobile communication system, there is known a system described in, for example, "RAYLEIGH FADING COMPENSATION METHOD FOR MULTI-LEVEL QAM FOR LAND MOBILE COMMUNICATIONS", Review of The Communications Research Laboratory, Japan, February 1991, pp. 87–98 (particularly, FIGS. 2 to 7) and "PERFORMANCE OF IMPLEMENTED 16 QAM MODEM FOR LAND MOBILE COMMUNICATION SYSTEMS", Review of The Communications Research Laboratory, February 1991, pp. 99–107 (particularly FIG. 4). "MULTI-LEVEL QUADRATURE AMPLITUDE MODULATION TECHNIQUES", Review of The Communications Research Laboratory, February 1991, pp. 85–86 describe abstracts of the aforementioned two papers. When a multi-level QAM (Quadrature Amplitude Modulation) wave is transmitted under Rayleigh fading, an amplitude and a phase thereof are varied due to the fading to thereby change a magnitude and an inclination of a signal space diagram thereof while the whole form or configuration of the signal space diagram is not changed. The above system utilizes the characteristic that the whole configuration of the signal space diagram is not changed. On a transmitting side, transmission data of a frame format having a predetermined number of symbols formed by periodically inserting a predetermined symbol (hereinafter referred to as a pilot symbol) of the signal space diagram into a series of data symbols is transmitted and on a receiving side a signal space position of the pilot symbol is detected and an amount of fading distortion of each symbol is estimated and compensated on the basis of relative positional relation of points to decode the data.

FIG. 3 shows an example of the pilot symbol in 16 QAM in which a point A of 16 symbols is used as the pilot symbol.

An example of a prior art adopting the above system is now described with reference to FIG. 2.

In FIG. 2, numeral 2 denotes a clock reproducing unit, 3 a data symbol input control unit, 4 a data delay unit, 5 a fading distortion amount calculation unit, 6 a fading distortion estimation and compensation unit, 9 a pilot symbol input control unit, and 10 a pilot detection unit.

An input signal is a received and detected complex baseband signal u(t). The received signal is supplied to the pilot detection unit 10 and the clock reproducing unit 2 so that a predetermined pilot detection signal and clock signal are produced by the units 10 and 2, respectively. The pilot symbol input control unit 9 takes out only the pilot symbol in accordance with the pilot detection signal to supply the pilot symbol to the fading distortion amount calculation unit 5. When a transmission complex baseband signal is z(t) and a fading distortion is c(t), respectively, and noise and other influence are neglected, the received complex baseband signal u(t) is expressed by $$u(t)=z(t) \times c(t) \tag{1}$$

Accordingly, when a reception pilot symbol is up and a transmission pilot symbol is p, an amount of fading distortion $c_p$ in the pilot symbol is calculated by $$c_p = u_p/P \tag{2}$$

The fading distortion amount calculation unit 5 calculates the fading distortion amount in the pilot symbol in accordance with the equation (2).

The received data is supplied to the data symbol input control unit 3 which takes out only a data symbol at a data identification point from the received data and the data symbol is supplied to the data delay unit 4. The data delay unit 4 delays the data symbol by a time required to estimate the fading distortion amount in the data symbol in the fading distortion estimation and compensation unit 6.

The fading distortion estimation and compensation unit 6 estimates the fading distortion amount in the data symbol on the basis of the fading distortion amount of the pilot symbol calculated by the fading distortion amount calculation unit 5 by means of the interpolation method as shown in FIG. 5. Further, the fading distortion estimation and compensation unit 6 multiplies an inverse number (conjugate complex number) of the calculated distortion amount by the data symbol inputted from the data delay unit 4 to compensate the fading.

FIG. 4 shows an example of a frame format used in the prior art. This frame format is described in the aforementioned "Review of The Communications Research Laboratory", February 1991, page 89.

SUMMARY OF THE INVENTION

The aforementioned conventional fading compensation technique can be applied to the system having the transmission frame format shown in FIG. 4. But, when the conventional fading compensation technique is to be applied to a communication system in which the channel division is made by the time division multiple access method including a frame format (as shown in FIG. 6 by way of example) having no pilot symbol at the beginning and the end of the frame and in which a phase of a carrier is reset at each frame, phase variation at the time when the frame is changed is unfavorably calculated as the fading distortion amount since the phase of the carrier is reset at each frame, so that data until the first pilot symbol of the frame and data until the end of the frame from the last pilot symbol of the frame are compensated in error.

It is an object of the present invention to provide a fading distortion compensation method and a circuit thereof capable of compensating for fading distortion exactly regardless of an insertion position of a pilot symbol in a frame in a communication system using a time division multiple access method in which a phase of a carrier is reset at each frame.

In order to achieve the object, according to one aspect of the present invention, pilot symbols of a frame in which fading distortion compensation is to be performed and pilot symbols of frames positioned before and behind the frame are used in a receiving side to compensate for the fading distortion. As a circuit for performing the compensation, a phase correction circuit for correcting phase variation due to reset of the carrier is provided. When the pilot symbols of the before and behind positioned frames are used, the phase correction circuit corrects the pilot symbols to thereby remove influence due to the reset of the carrier.

Thus, the phase variation produced among the frames due to the reset of the carrier phase can be corrected and the interpolation method can be applied by using the pilot symbols of the before and behind positioned frames to thereby compensate for the fading distortion.

DESCRIPTION OF THE PREFERRED EMBODIMENTS

Figure 1:
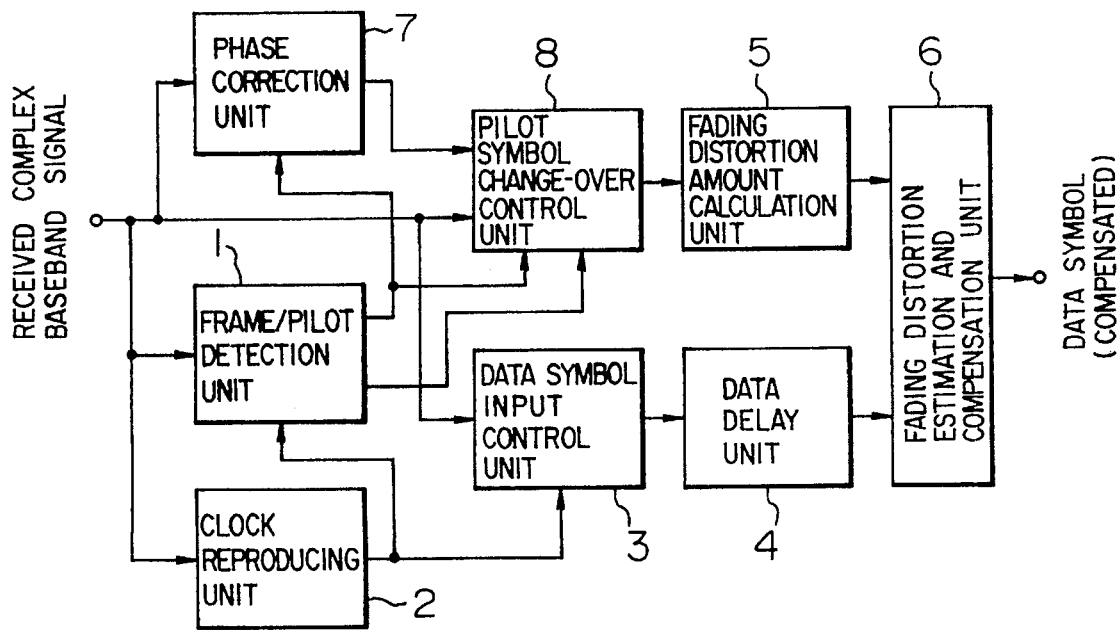
FIG. 1 is a block diagram schematically illustrating an embodiment of the present invention.
Figure 2:
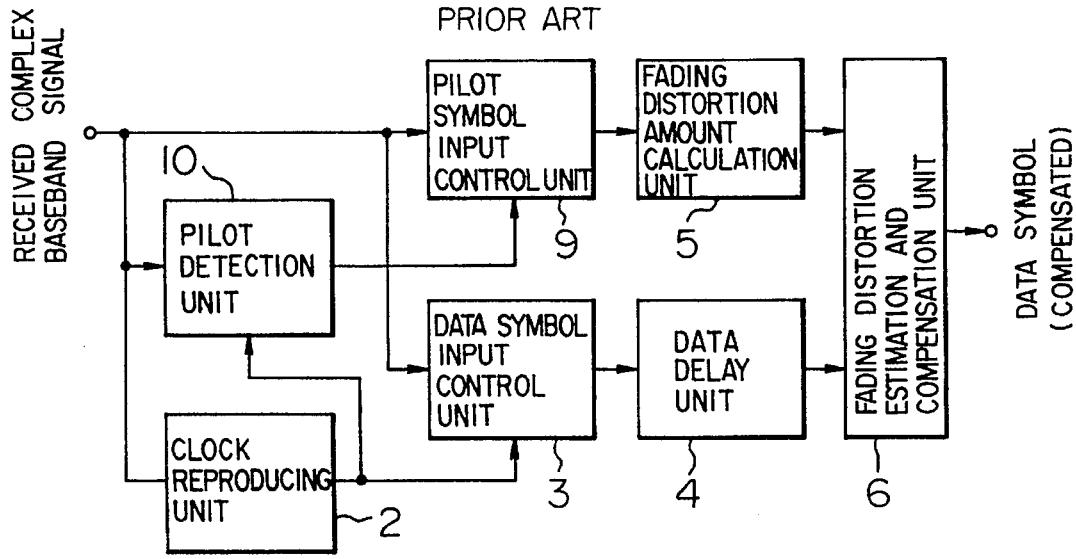
FIG. 2 is a block diagram schematically illustrating an example of a conventional fading compensation circuit.
Figure 3:
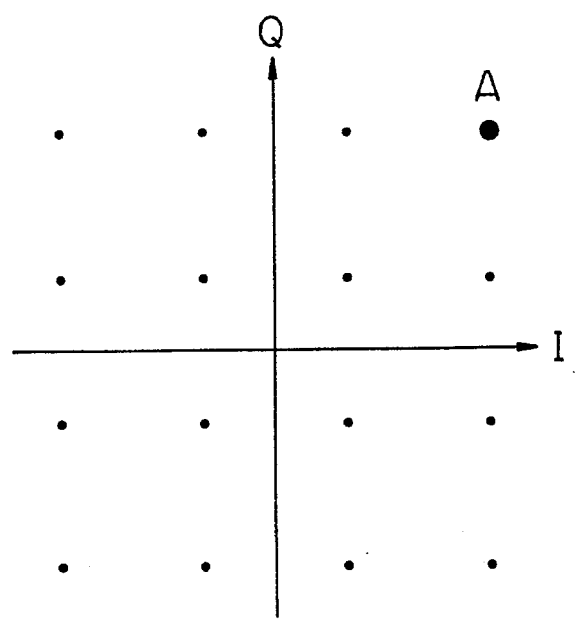
FIG. 3 shows an example of a conventional pilot symbol.
Figure 4:
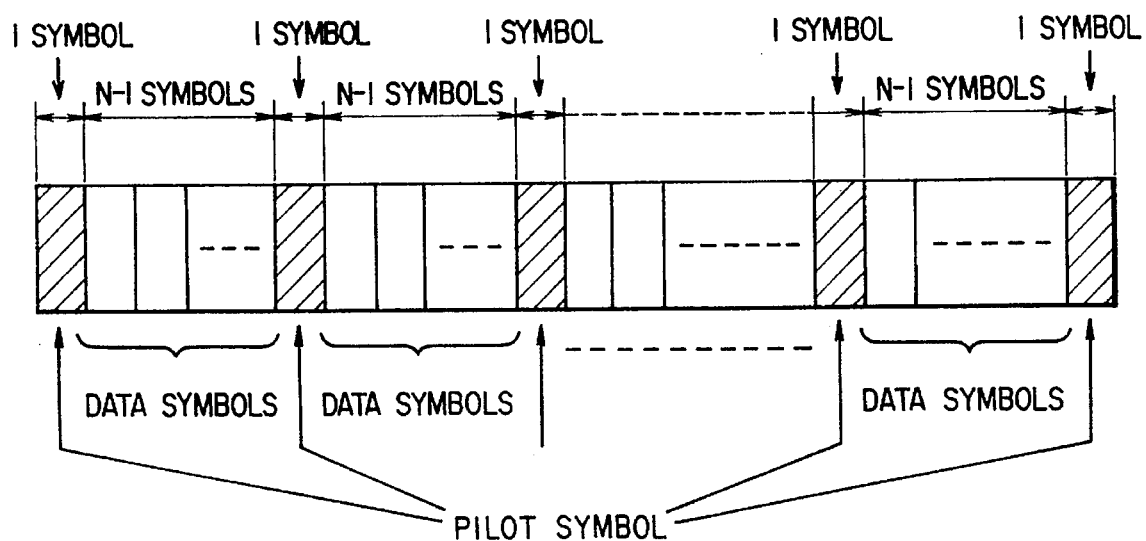
FIG. 4 shows an example of a frame format in a prior art.

The present invention is now described with reference to FIGS. 1, 7 and 8. In FIG. 1, numeral 1 denotes a frame/pilot detection unit, 7 a phase correction circuit, and 8 a pilot symbol change-over control unit. In FIG. 1, like elements to those of FIG. 2 are designated by like numerals.

The received complex baseband signal $U(t)=I(t)+jQ(t)$ is supplied to the frame/pilot detection unit 1 and the clock reproducing unit 2 to produce a frame signal and a pilot detection signal and a reproduced clock signal by the frame/pilot detection unit 1 and the clock reproducing unit 2, respectively. Further, the received complex baseband signal is also supplied to the phase correction circuit 7 in which a phase in the phase variation produced due to the reset of the carrier is corrected (phase rotation $\pm\theta x$).

This phase correction method is now described.

Figure 7:
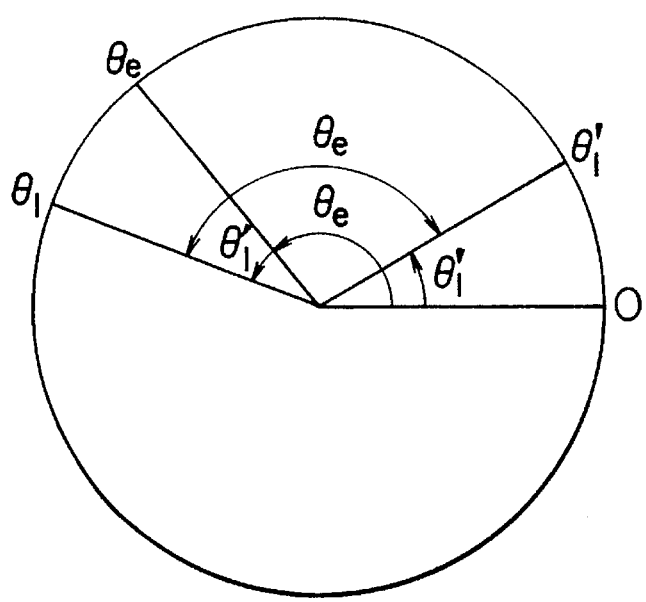
FIG. 7 is a diagram illustrating a phase error upon reset of a carrier phase.

FIG. 7 illustrates a carrier error upon reset of a carrier phase. In FIG. 7, in respect to a phase variation $\theta$ due to the transmission carrier, when a time of one frame in a carrier frequency $\omega_0$ is $T_F$, since a phase at the beginning of the frame is zero, the phase $\theta_e$ at the end of the frame is $\omega_0 \cdot T_F$. When a time until a pilot symbol of the next frame is $T_n$ and the phase of the carrier is not reset, the phase is $\theta_1=\theta_e+\omega_0 \cdot T_n$. However, since the phase is returned to zero when the frame is changed to the next frame, the phase is $\theta_1'=\omega_0 \cdot T_n$. Accordingly, since the phase variation due to the reset of the carrier phase is $\theta_x=\theta_1-\theta_1'=\theta_e$, the phase correction circuit 7 of FIG. 1 rotates the phase by $\theta_x$ to correct the phase. Similarly, when a pilot in the preceding frame is used, the phase is rotated by $-\theta_x$.

The phase correction method is now described in more detail.

In order to correct the phase rotation $\theta_x$(rad) due to the carrier reset performed when the frame is changed to the next frame, the following calculation is made for the received baseband signal $U(t)$.

$$U'(t)=U(t)\times e^{j\theta x}$$

where $e^{j\theta x}=\cos\theta_x=j\sin\theta_x$.

The correction equation is divided into an in-phase component and a quadrature-phase component of a complex signal and the corrected signal $U'(t)$ is expressed by $$U'(t)=I'(t)+jQ'(t)$$

The above correction equation is expressed by $$I'(t)=I(t)\cos\theta_x-Q(t)\sin\theta_x$$

$$Q'(t)=I(t)\sin\theta_x+Q(t)\cos\theta_x$$

Figure 8:
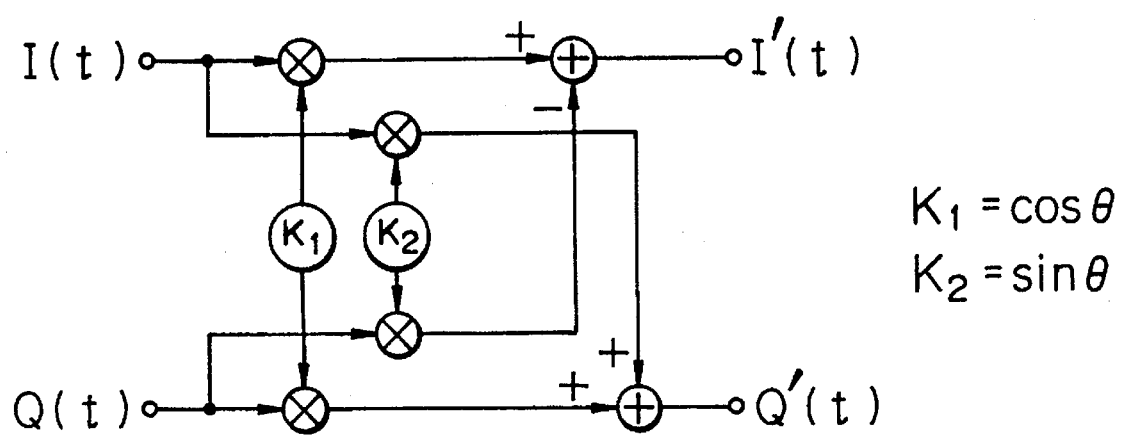
FIG. 8 is a schematic diagram illustrating a phase correction circuit.

FIG. 8 schematically illustrates an example of the phase correction circuit for performing the above correction calculation.

The pilot symbol change-over control unit 8 judges on the basis of the pilot detection signal and the frame signal from the frame/pilot detection unit 1 whether the detected pilot symbol is a pilot symbol of the frame in which fading distortion compensation is to be performed (hereinafter referred to as a frame of interest) or not.

An example of the judgment is now described.

Figure 6:
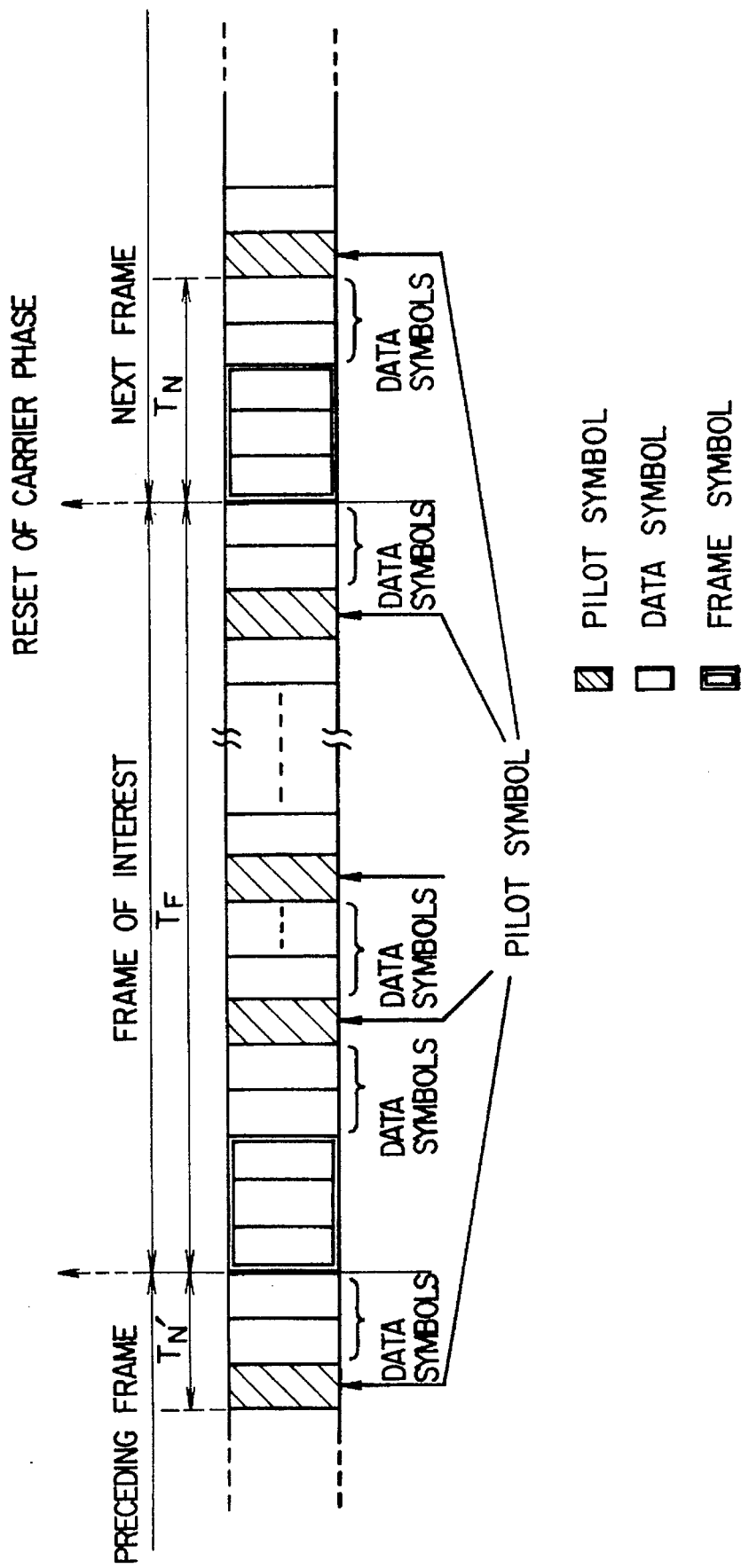
FIG. 6 is a diagram showing another example of a frame format.

A frame format of the transmitted signal is assumed to be as shown in FIG. 6, for example.

Since the number of symbols constituting one frame is determined to be a predetermined number, a frame symbol positioned at the head of the frame of interest (the frame in which fading distortion compensation is to be performed) in the received frames is defined as a reference frame symbol and the number of symbols (or time) between the reference frame symbol and the detected pilot symbol is counted. If the count (or time) of the symbols is within the predetermined number, the pilot symbol can be judged to be a pilot symbol within the frame of interest, while if the count exceeds the predetermined number, the pilot symbol can be judged to be a pilot symbol of another frame.

When the detected pilot symbol is judged to be within the frame of interest, the pilot symbol change-over control unit 8 selects the received complex baseband signal as an input signal thereof without intervention of the phase correction circuit 7. On the other hand, when the detected pilot symbol is judged to be a pilot symbol of another frame, the pilot symbol change-over control unit 8 selects the signal having the phase corrected by the phase correction circuit 7 as an input signal.

After selection of the input signal, the pilot signal is taken out and is supplied to the fading distortion amount calculation unit 5.

The fading distortion amount calculation unit 5 calculates the fading distortion amount in the pilot symbol.

The received complex baseband signal is also supplied to the data symbol input control unit 3 in which only the data symbol at the data identification point is extracted in accordance with the reproduced clock from the clock reproducing unit 2 and is supplied to the data delay unit 4. The data delay unit 4 delays the data symbol by the time required to estimate the fading distortion amount in the data symbol by the fading distortion estimation and compensation unit 6.

Figure 5:
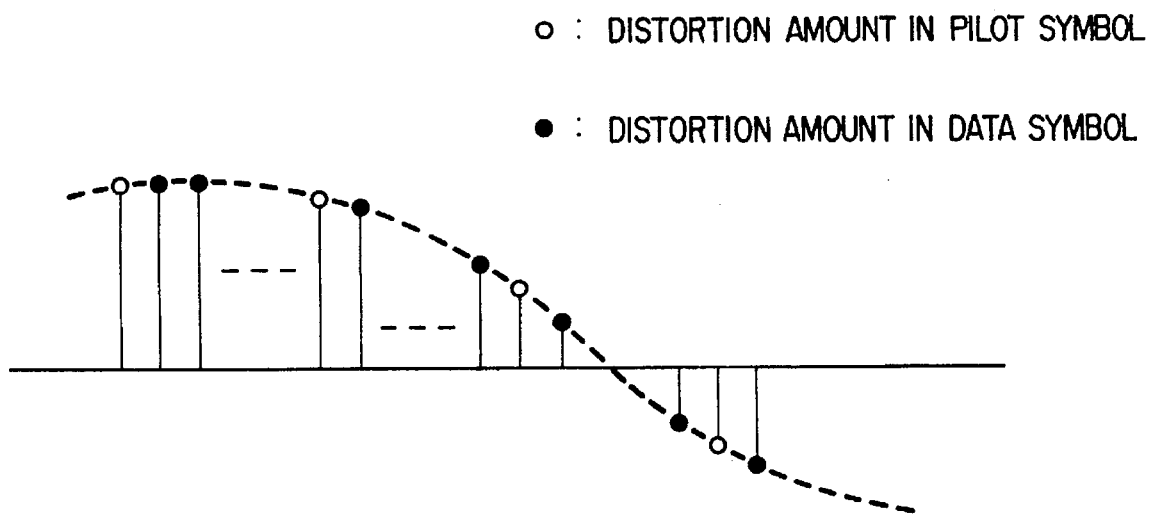
FIG. 5 is a diagram illustrating the interpolation of data symbols.

The fading distortion estimation and compensation unit 6 estimates a fading distortion amount in the data symbol on the basis of the fading distortion amount of the pilot symbol calculated by the fading distortion amount calculation unit 5 by means of the interpolation method as shown in FIG. 5 and compensates the fading distortion by multiplying an inverse number (conjugate complex number) of the calculated distortion amount by the data symbol inputted from the data delay unit 4.

In this manner, since the pilot symbol of the frame of interest and the pilot symbols of the frames positioned before and behind the frame of interest are used to estimate and compensate the fading distortion, the fading distortion for all symbols can be compensated exactly even for the frame format having symbols except the pilot symbol at the beginning and the end of the frame as shown in FIG. 6.

According to the present invention, there can be realized the fading compensation method and the circuit thereof capable of compensating the fading distortion exactly for all symbols in the frame by utilizing the pilot symbols in the frames positioned before and behind the frame in which the fading distortion is to be compensated regardless of the insertion position of the pilot symbol in the frame even in the communication system of the time division multiple access method in which the carrier phase is reset at each frame.

We claim:

1. A fading distortion compensation method in a digital communication system comprising the steps of:

receiving an input signal having a frame format composed of a group of a predetermined number of symbols in which pilot symbols are periodically arranged among a series of data symbols on a transmission side wherein a carrier is reset at each frame;

correcting phase variation due to said reset of the carrier by phase correction means in respect to said received input signal;

selecting the received input signal for a frame in which fading distortion is to be compensated and selecting an output signal of said phase correction means for other frames to extract a pilot symbol from said selected input signal; and compensating fading distortion for said received input signal on a receiving side at each frame wherein said fading distortion compensation is performed by using pilot symbols of a frame in which said fading distortion compensation is to be performed and pilot symbols of frames positioned before and behind of the frame in which said fading distortion compensation is to be performed.

2. A fading distortion compensation method according to claim 1, wherein said frame format is such that a symbol at the beginning or the end of a frame does not contain a pilot symbol.

3. A fading distortion compensation circuit of a receiver in a digital communication system in which transmission data having a frame format composed of a group of a predetermined number of symbols in which pilot symbols are periodically arranged among a series of data symbols are transmitted in a frame unit and a carrier is reset at each frame, comprising:

phase correction means for correcting phase variation due to said reset of the carrier in respect to a received input signal;

means for selecting the received input signal for a frame in which fading distortion is to be compensated and selecting an output signal of said phase correction means for other frames to extract a pilot symbol from said selected input signal; and fading distortion compensation means for compensating fading distortion of data symbols from said extracted pilot symbol and data symbols contained in the received input signal.

4. A fading distortion compensation circuit according to claim 3, wherein said fading distortion compensation means comprises means for calculating an amount of fading distortion of said extracted pilot symbol from said pilot symbol and means for estimating an amount of fading distortion in said data symbols.

5. A fading distortion compensation circuit according to claim 3, wherein said frame format is such that a symbol at the beginning or the end of a frame does not contain a pilot symbol.

* * * * *